United States Patent
Thompson et al.

(10) Patent No.: US 7,451,449 B2
(45) Date of Patent: Nov. 11, 2008

(54) WORK ALLOCATION SYSTEM

(75) Inventors: Simon G Thompson, Ipswich (GB); Thomas J Stark, Chelmsford (GB); Paul J Kearney, Felixstowe (GB)

(73) Assignee: British Telecommunications plc, London (GB)

( * ) Notice: Subject to any disclaimer, the term of this patent is extended or adjusted under 35 U.S.C. 154(b) by 661 days.

(21) Appl. No.: 10/471,412

(22) PCT Filed: Mar. 15, 2002

(86) PCT No.: PCT/GB02/01218

§ 371 (c)(1), (2), (4) Date: Sep. 11, 2003

(87) PCT Pub. No.: WO02/080055

PCT Pub. Date: Oct. 10, 2002

(65) Prior Publication Data

US 2004/0088206 A1 May 6, 2004

(30) Foreign Application Priority Data

Mar. 29, 2001 (EP) .................................. 01302944

(51) Int. Cl.
*G06F 9/46* (2006.01)
*G06F 15/173* (2006.01)
*G06F 9/44* (2006.01)
*G06F 17/50* (2006.01)
*G05B 19/418* (2006.01)

(52) U.S. Cl. ........................ 718/104; 718/100; 718/102; 709/226; 705/7; 705/8

(58) Field of Classification Search .............. 718/100, 718/102, 104; 707/7; 709/223, 226; 705/7, 705/8
See application file for complete search history.

(56) References Cited

U.S. PATENT DOCUMENTS 5,093,794 A 3/1992 Howie et al.
(Continued)

FOREIGN PATENT DOCUMENTS

EP 1 226 497 7/2005
(Continued)

OTHER PUBLICATIONS

European Search Report dated Aug. 29, 2001.
(Continued)

*Primary Examiner*—Meng-Ai An
*Assistant Examiner*—Qing-Yuan Wu
(74) *Attorney, Agent, or Firm*—Nixon & Vanderhye PC

(57) ABSTRACT

A work allocation system has a plurality of agents that bid for work in accordance with preferences and behavior of corresponding resources. Each agent represents a group of resources and is arranged to evaluate the likelihood that at least one resource in the group can carry out a work item. The evaluation is dependent on work items previously selected and/or carried out by the resource, so that the agent effectively models the preferences of its workers. The agent can use this preference information to decide a bidding strategy (i.e. to decide which work items it can bid for), and, having successfully bid for a work item, can allocate work based on individual characteristics and observed work preferences. The bidding for work between agents is, for example, conducted in accordance with contract net based negotiation.

11 Claims, 11 Drawing Sheets

U.S. PATENT DOCUMENTS

| | | | |
|---|---|---|---|
| 5,111,391 | A | 5/1992 | Fields et al. |
| 5,353,229 | A | 10/1994 | Tanaka |
| 5,394,324 | A * | 2/1995 | Clearwater ................. 705/8 |
| 5,467,268 | A | 11/1995 | Sisley et al. |
| 5,504,837 | A | 4/1996 | Griffeth et al. |
| 5,586,219 | A | 12/1996 | Yufik |
| 5,596,502 | A | 1/1997 | Koski et al. |
| 5,638,494 | A | 6/1997 | Pinard et al. |
| 5,732,078 | A | 3/1998 | Arango |
| 5,802,396 | A | 9/1998 | Gray |
| 5,826,040 | A | 10/1998 | Fargher et al. |
| 5,826,239 | A | 10/1998 | Du et al. |
| 5,832,483 | A | 11/1998 | Barker |
| 5,870,545 | A | 2/1999 | Davis et al. |
| 5,937,388 | A | 8/1999 | Davis et al. |
| 5,943,652 | A | 8/1999 | Sisley et al. |
| 5,953,229 | A | 9/1999 | Clark et al. |
| 5,963,911 | A | 10/1999 | Walker et al. |
| 6,014,673 | A | 1/2000 | Davis et al. |
| 6,041,306 | A | 3/2000 | Du et al. |
| 6,052,684 | A | 4/2000 | Du |
| 6,078,982 | A | 6/2000 | Du et al. |
| 6,226,273 | B1 | 5/2001 | Busuioc et al. |
| 6,263,358 | B1 | 7/2001 | Lee et al. |
| 6,321,207 | B1 * | 11/2001 | Ye .............................. 705/8 |
| 6,374,227 | B1 * | 4/2002 | Ye .............................. 705/8 |
| 6,578,005 | B1 | 6/2003 | Lesaint et al. |
| 7,065,493 | B1 | 6/2006 | Homsi |
| 2002/0004827 | A1 * | 1/2002 | Ciscon et al. ............... 709/223 |
| 2002/0029213 | A1 * | 3/2002 | Borissov et al. ............. 707/7 |
| 2003/0083926 | A1 * | 5/2003 | Semret et al. ................ 705/10 |
| 2004/0010592 | A1 * | 1/2004 | Carver et al. ............... 709/226 |

FOREIGN PATENT DOCUMENTS

| | | |
|---|---|---|
| GB | 2194086 A | 2/1988 |
| GB | 2322037 A | 8/1998 |
| WO | WO 95/15635 | 6/1995 |
| WO | WO 96 03692 A | 2/1996 |
| WO | WO 98/22897 | 5/1998 |
| WO | WO 99/11003 | 3/1999 |
| WO | WO 99/17194 | 4/1999 |
| WO | WO 01/29663 A1 | 4/2001 |

OTHER PUBLICATIONS

International Search Report dated Jan. 16, 2006.
Brandolese et al., "A Multi-Agent Approach for the Capacity Allocation Problem", International Journal of Production Economics, Jul. 20, 2000, Elsevier, Netherlands, vol. 66, No. 3, pp. 269-285, XP002226014.
Tharumarajah et al., "Approaches and Issues in Scheduling a Distributed Shop-Floor Environment", Computers in Industry, Elsevier Science Publishers, Amsterdam, NL., vol. 34, No. 1, Oct. 1, 1997, pp. 95-109, XP004097814.
Chavez et al., "Challenger: A Multi-Agent System for Distributed Resource Allocation", Proceedings of the First International Conference on Autonomous Agents Marina Del Rey, CA., Feb. 5-8, 1997, Proceedings of the International Conference on Autonomous Agents, New York, ACM, US, vol. CONF. 1, Feb. 5, 1997, pp. 323-332, XP002092534.
Genesereth, "Software Agents", Communications of the ACM, vol. 37, No. 7, Jul. 1, 1994, pp. 48-53, XP002176092.
Oliveira et al., "Multi-agent Systems: Which Research for Which Applications", Robotics and Autonomous Systems, Elsevier Science Publishers, Amsterdam, NL, vol. 27, No. 1-2, Apr. 30, 1999, pp. 91-106, XP004164321.
Nandy et al., "A Connectionless Approach to Providing QoS in IP Networks", Computing Technology Lab, Norel, XP002137755.
O'Neill et al., "An Overview of Internet Protocols", BT Technology, vol. 16, No. 1, Jan. 1998, XP-000736934.
Ramos, "A Holonic Approach for Task Scheduling in Manufacturing Systems", IEEE International Conference on Robotics and Automation, vol. 3, Apr. 22-28, 1996, pp. 2511-2516.
Goscinski et al., "Resource Management in Large Distributed Systems", Operating Systems Review (SIGOPS), vol. 24, No. 4, Oct. 1, 1990, pp. 7-25.
Lin et al., "An Agent-Based Flexible Routing Manufacturing Control Simulation System", Proceedings of the 1994 Winter Simulation Conference, pp. 970-977.
Sandholm, Limitations of the Vickrey Auction in Computational Multiagent Systems, Proceedings of ICMAS '96, 2nd International Conference on Multiagent Systems, Kyoto, Japan, Dec. 10-13, 1996, pp. 299-306, XP002092535.
Nwana et al., An Introduction to Agent Technology, BT Technology Journal, vol. 14, No. 4, Oct. 1996, pp. 55-67, XP000635333.
International Search Report (PCT/GB/98 02944) dated Feb. 18, 1999.
Parrott et al., "Comparing the WMS Real Time Algorithm With AIP Predictive Schedulers", BT Technology Journal, vol. 13, No. 1, Jan. 1, 1995, pp. 110-120.
Mohan, "Recent Trends in Workflow Management Products, Standards and Research", IBM Almaden Research Center white paper, 1997.
Georgakopoulos et al., "An Overview of Workflow Management" from process modeling to workflow automation infrastructure, Distributed and Parallel Databases, 1995.
"HP Process Manager Process Design Guide", HP Process Manager, 1998.
Bender et al., "Practical Modeling for Resource Management", Harvard Business Review, Mar./Apr. 1981.
Shan et al., "HP Workflow Research" past, present, future, North Atlantic Treaty Organization—Advanced Study Institute Workshop, 1997.
Wallace, "Practical Applications of Constraint Programming", Constraints: An International Journal, 1996.
Tsang et al., "Constraint Satisfaction in Discrete Optimization", Unicom Seminar, Mar. 1998.
Tarumi et al., "WorkWeb System—Multi-Workflow Management with a Multi-Agent System", ACM Siggroup, 1997.
Shan, "Business Process Flow Management and its Application in the Telecommunications Management Network—HP's OpenPM Middleware Technology", Hewlett-Packard Journal, Oct. 1996.
Ezpeleta et al., "A Petri Net Based Deadlock Prevention Policy for Flexible Manufacturing Systems", IEEE, 1995.
Raman et al., "Matchmaking: An Extensible Framework For Distributed Resource Management", Baltzer Science Publishers, Cluster Computing, 1999.
Reveliotis et al., "Polynomial-Complexity Deadlock Avoidance Policies for Sequential Resource Allocation Systems", IEEE, 1997.
Smith, "The Contract New Protocol: High-Level Communication and Control in a Distributed Problem Solver", Transactions on Computers, vol. C-29, No. 12, pp. 1104-1113, Dec. 1980.
Alternative Protocols to "Contract Net", FIPA web site.
Collis et al, "The Zeus Agent Building Toolkit", Technology Journal 16(3) Jul. 1998, pp. 60-80.
Ndumu et al., "Towards Desktop Personal Travel Agents", BT Technology Journal, vol. 16, No. 3, Jul. 1998.
Shannon, "A Mathematical Theory of Communication", The Bell System Technical Journal, vol. 27, pp. 379-423, 623-656, Jul., Oct. 1948.
Quinlan, "Induction of Decision Trees", Machine Learning 1:81-106, 1986.
Smyth, "An Information Theoretic Approach To Rule Induction from Database", IEEE,1992.
Kononenko, "On Biases In Estimating Multi-Valued Attributes", Proceedings of the International Joint Conference on Artificial Intelligence, 1995 (IJCAI '95), pp. 1034-1040.
Sim et al., "Simulation of a Multi-agent Protocol for Task Allocation in Cooperative Design", 1999, IEEE.
Shen et al., A Hybrid Agent-Oriented Infrastructure for Modeling Manufacturing Enterprises, Proceedings of KAW '98.

* cited by examiner

|  | Urgent | Middle | None |
|---|---|---|---|
|  | 19 | 54 | 60 |
|  | 0 | 30 | 60 |
|  | 0 | 0 | 30 |

Fig 7

|  | Urgent | Middle | None |
|---|---|---|---|
| Red | 41 | 6 | 0 |
| Amber | 60 | 30 | 0 |
| Green | 60 | 60 | 30 |

WORK ALLOCATION SYSTEM

This application is the U.S. national phase of international application PCT/GB02/01218 filed 15 Mar. 2002 which designated the U.S.

RELATED APPLICATIONS

This application is related to the following commonly assigned applications:
1. U.S. Ser. No 09/194,775 filed May 4, 2000 naming Purohit, Judge, Shepherdson and Odgers as inventors, now abandoned
2. U.S. Ser. No. 10/088,687 filed Mar. 21, 2002 naming Odgers, Thompson and Shepherdson as inventors

BACKGROUND

1. Technical Field

The present invention relates to a method of and apparatus for reviewing work items for allocation to a resource, particularly but not exclusively suited to a work allocation system.

2. Related Art

Work allocation systems are well known and are generally referred to as scheduling systems, resource allocation systems, or workflow systems. Essentially, work allocation systems are concerned with optimising the allocation of a plurality of resources to a plurality of tasks given certain constraints.

In many known systems, work allocation is modelled using so-called agent-based technology. An agent is a computer program that acts on behalf of an entity such as a user or a piece of equipment. The agent typically holds data relating to the entity that it represents and is provided with decision-making software for making decisions on behalf of the entity. In the context of work allocation systems, an agent is known to represent single entities such as a resource, a work-processing centre, and a central administration centre.

Agents typically communicate with other agents in an attempt to accomplish a goal. R. Smith introduced a mechanism for collaboration between agents, known as the "contract net" protocol, in 1980. The mechanism is described in "The contract net protocol: High-level communication and control in distributed problem solver," IEEE Transactions on Computers, 29(12):1104-1113, December 1980. When an agent needs the services of other agents, it plays the role of a "manager" and attempts to contract work out to other "contractor" agents. Other protocols apart from the "contract net" can be used, for example, "English Auction" and "Dutch Auction". A library of these can be found at the FIPA web site identified by the identifiers XC00025 to XC00036. Alternativley, other forms of signals between agents could be used, for example, by updating a shared database record, or otherwise altering an object in the shared agent environment.

Many known agent-based systems employ the contract net protocol for allocating tasks to agents. In particular, the multi-agent system of Kwang Mong Sim etal, described in "Simulation of a multi-agent protocol for task allocation in cooperative design", Proceedings of the IEEE systems, Man and cybernetics 1999, uses the contract net protocol to coordinate agent activities to accomplish a goal. Essentially, whenever an agent needs the services of another agent it announces the tasks to be done, whereupon at least some of the other agents bid for the tasks. The bid includes information such as expertise to perform the task and experience in performing similar tasks; the requesting agent selects a bidding agent in dependence on the information in the bid. In this system each agent is assumed to be responsible only for its own activities, so that a bid comprises information relating to a single agent, and the requesting agent is essentially comparing the capabilities of single agents.

International patent application GB98/02944 (publication number WO 99/17194) describes a resource handling system where, again, tasks are announced by an agent (referred to as manager), and so-called contracting agents evaluate the task with respect to their own abilities and commitments and submit bids (or not, as the case may be) in accordance therewith. The communication of task announcement, bid submission and acceptance is handled in accordance with the contract net protocol (and other similar communication protocols). In this system the contracting agents represent a work-processing centre, and, when formulating a bid, a contracting agent reviews availability, skills and rates of pay of the workforce associated with its respective work-processing centre. In this application the "workforce" is modelled as a single entity.

The Zeus Toolkit ("The Zeus Toolkit", Collis, J, Ndumu, D, Nwana,H; BT Technology Journal 16(3) July 1998 p60-68) contains tools to construct agent systems that utilize the contract net protocol in this way. The article "Co-ordination in Software Agent Systems" (Nwana,H, Lee,L., & Jennings,J. BT Technology Journal 14(4) 1996) surveys these and other co-ordination systems.

The agent system described in "A hybrid agent-oriented infrastructure for modelling manufacturing enterprises", Shen and Norrie, presented at the $11^{th}$ workshop on knowledge acquisition, modelling and management, describes use of mediator agents in an agent-based multi-functional system. The mediator agents provide a "gateway" to other agent types, meaning that each agent subsystem is connected to the overall system through a special mediator. The authors consider this architecture to provide an efficient way of integrating a range of agent-based services. A mediator agent receives task requests from other mediator agents, then formulates and sends out task messages to agents associated therewith. Agents receiving the task messages formulate and return bids to their associated mediator agent, which passes the bid information to the originally requesting mediator agent.

In these known systems, each agent represents a single entity whose characteristics and capabilities are modelled by the agents; for example in the case of an agent representing a resource, each agent holds data representative of skills and location attributes corresponding to the resource, and negotiates for work on the basis of the attribute data.

In certain situations it would be useful if an agent could represent a group of entities, for example a team of workers. This would be useful because service-based industries are now considering allocating work to self-managed teams, rather than to individual workers. In self-managed teams, work is allocated to a team (typically by bidding, based on, e.g. the contract net protocol described above) and the team then has a responsibility to get the work done; if the work is not done, the team does not get paid. Typically the teams are flexible, meaning that workers can leave and join a team, effectively choosing the team that they want to be a part of (on the basis of incentives, personal constraints etc.).

However, such an arrangement is non-trivial to model. Currently a resource allocation system negotiates for resources with the assumption that the resources represented by an agent will be available. If the resources change, for example because a worker has moved from one team to another, this could mean that whichever job(s) involved that worker can no longer be carried out. As a result the system may have to repeat the negotiation process in respect of that/those jobs, and the team concerned will not receive payment.

BRIEF SUMMARY

According to an exemplary embodiment, there is provided a method of reviewing a work item for allocation to a group of resources, wherein review of the work item has been instigated by a work source means. The method includes the steps of creating a data structure identifying work items previously allocated to at least some of the resources in the group;

evaluating the probability that one of resources will carry out the work item based on values in the data structure; and comparing the evaluated probability with a suitability criterion so as to identify whether one of the resources is suitable to carry out the work item.

The method is performed by an apparatus, herein after referred to as a mediator agent, which has access to a data structure that is representative of a group of resources, which can be a team of workers. The data structure is configured such that workers can easily be added and removed therefrom, and is populated using previously stored data records corresponding to workers in the group. It is assumed that a worker does what he/she prefers to do, so that, by recording his/her work activities, his/her preferences are implicitly recorded.

Equipped with such a data structure a mediator agent can make decisions that are representative of the likely actions of its workers. For example, given a particular work item, the mediator agent conveniently uses the data structure to evaluate whether or not a worker in the team is likely to carry out the work item.

In a work allocation system, the work source means, hereinafter referred to as a work source agent, can be arranged to offer a work item to a plurality of mediator agents, for review according to the invention, at a cost that depends on its operational priorities, such as the urgency of the work items and/or a value associated with an entity that originated the work item.

As described above, the mediator agents are then arranged to evaluate, on the basis of the data structure, whether or not one of the workers in the team is likely to carry out the work. If it appears likely that a worker within the team will carry out the work the mediator agent then decides whether or not to bid for the work item in accordance with its operational priorities.

Preferably, if one of the workers is identified as being suitable to carry out the work item, the mediator agent generates a bid comprising the evaluated price and signals the bid to the work source means.

Conveniently a mediator agent is arranged to receive a signal identifying that the bid has been successful, whereupon the mediator agent works out a price at which it can offer the work item to the workers. For all, or a selection of the workers, the mediator agent evaluates the similarity between the work item and work items previously allocated thereto, and selects one or more workers on the basis of the similarity. Then, for the or each selected worker, the mediator agent applies a price to the work item that is proportionate to the evaluated similarity, and offers the work item to the selected workers at the respective applied price. The mediator agent can additionally modify the price to account for the efficiency with which a given worker can complete the work item, so that, for example, its value is greater to a more efficient resource.

Alternatively the mediator agent can offer the work item to all workers in its group at the same price and allow the agents representative of the workers to select the work item at the offered price. The mediator agent could vary the price of the work item offered to the team on the basis of the time left to execute the work item.

As stated above, an example of a resource is a worker in a team. A resource can also be a computer program, and/or a machine, such as a computer or a router device. A work item can be a job to be carried out by a worker or a processing job to be carried out by a computer program and/or a device.

BRIEF DESCRIPTION OF THE DRAWINGS

An embodiment of the invention will now be described, by way of example, with reference to the accompanying drawings, in which:

FIG. 1b shows the architecture of a conventional computer for use in the system of FIG. 1a;

FIG. 7 shows an example of the way in which the data structure of FIG. 6 is used;

DETAILED DESCRIPTION OF EXEMPLARY EMBODIMENTS

Overview of Operating Environment

Figure 1A:
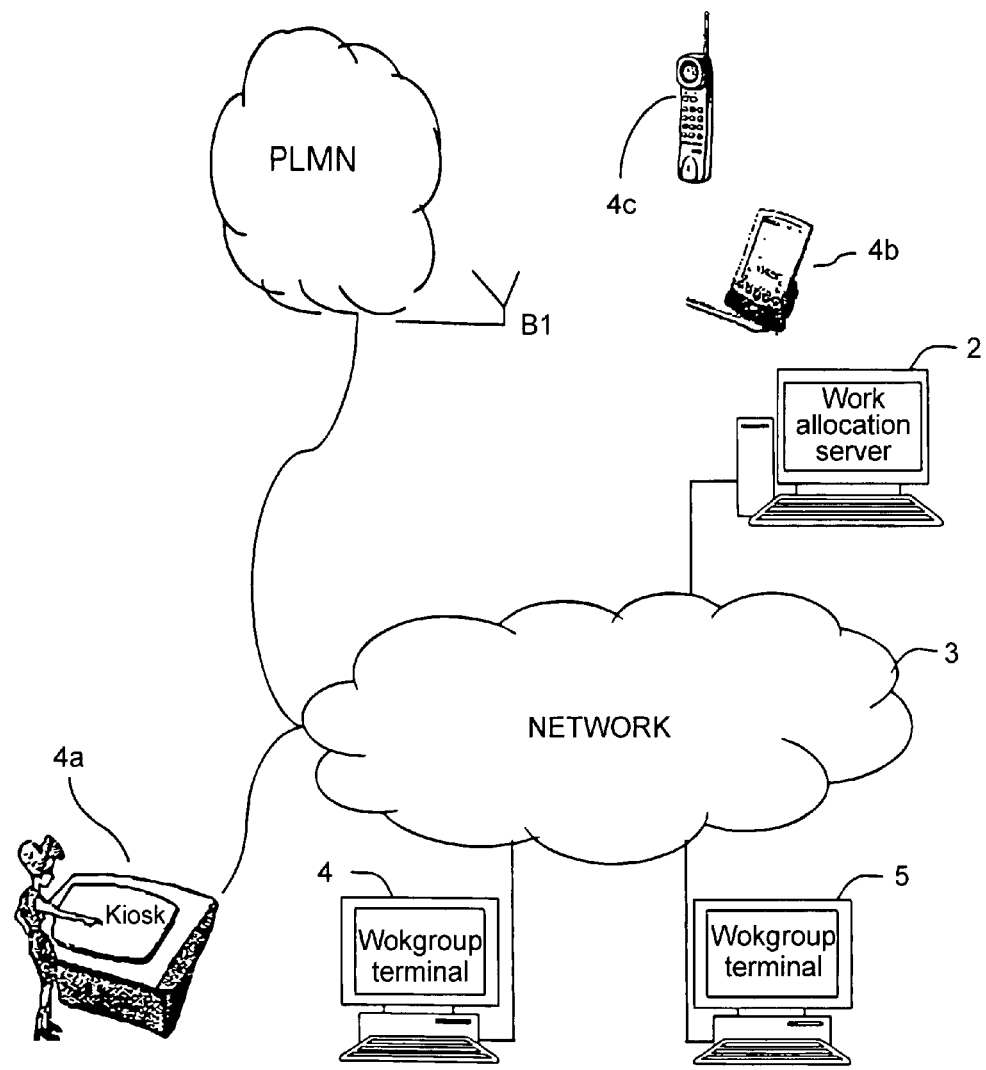
FIG. 1a is a schematic system diagram of an environment in which embodiments of the invention operate.

Referring to FIG. 1a, a work allocation system according to the invention can be run on one or more work allocation servers 2 which communicate via a network 3, for example an intranet, with first and second workgroup terminals 4, 5, and a kiosk 4a. The work allocation server 2 can also communicate, via public land mobile network (PLMN) and base station B1, with mobile devices such as a mobile phone 4c and a PDA 4b. Work allocation software runs on each of the computers 2, 4, 4a, 4c, 5 in the system.

Figure 1B:
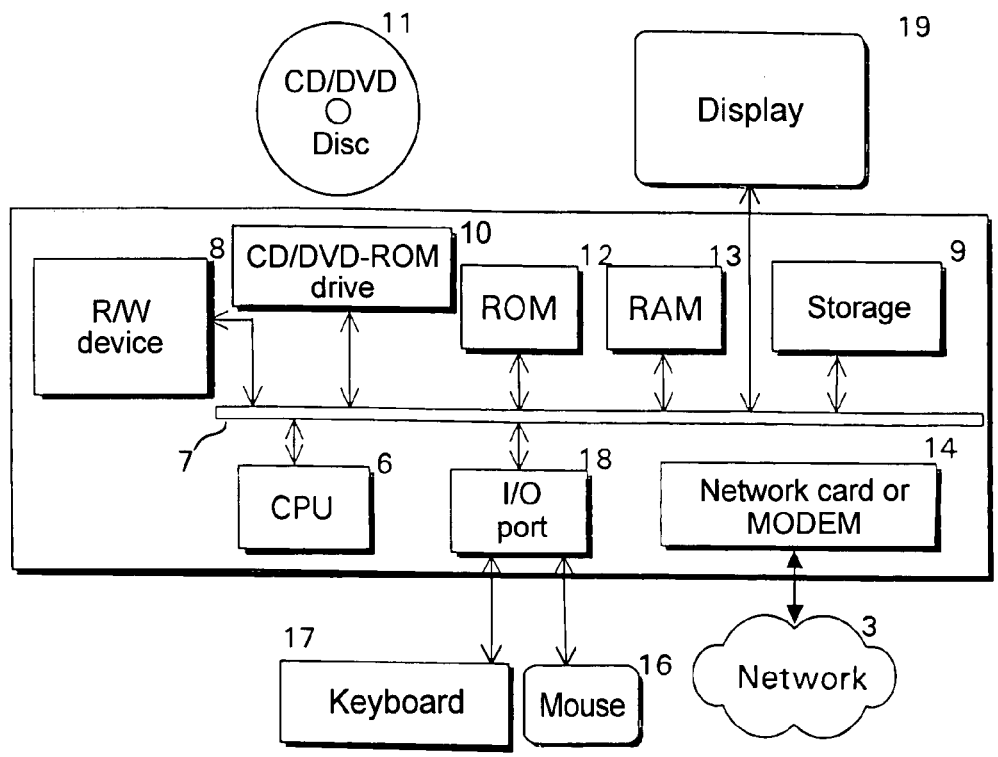

A typical architecture of each of the system computers 2, 4, 5 on which software implementing the invention can be run, is shown in FIG. 1b. Each computer comprises a central processing unit (CPU) 6 for executing computer programs and managing and controlling the operation of the computer. The CPU 6 is connected to a number of devices via a bus 7, the devices including a read/write device 8, for example a floppy disk drive for reading and writing data to and from a removable storage medium such as a floppy disk, a storage device 9, for example a hard disk drive for storing system and application software, a compact disc/digital video disc-read only memory (CD/DVD-ROM) drive 10 for reading data and programs from a CD/DVD disc 11 and memory devices including read only memory (ROM) 12 and random access memory (RAM) 13. The computer further includes a network card or modem 14 for interfacing to a network such as the intranet 3 and user input/output devices, which, for the fixed terminals 2, 4, 5 include a mouse 16 and keyboard 17 connected to the bus 7 via an input/output port 18. Each computer 2, 4, 4a, 4c, 5 also includes a display 19. It will be understood by the skilled person that the above described architecture is not limiting, but is merely an example of a typical computer architecture. It will be further understood that the described computer has all the necessary operating system and application software to enable it to fulfill its purpose.

Overveiw of Work Allocation System

Figure 2:
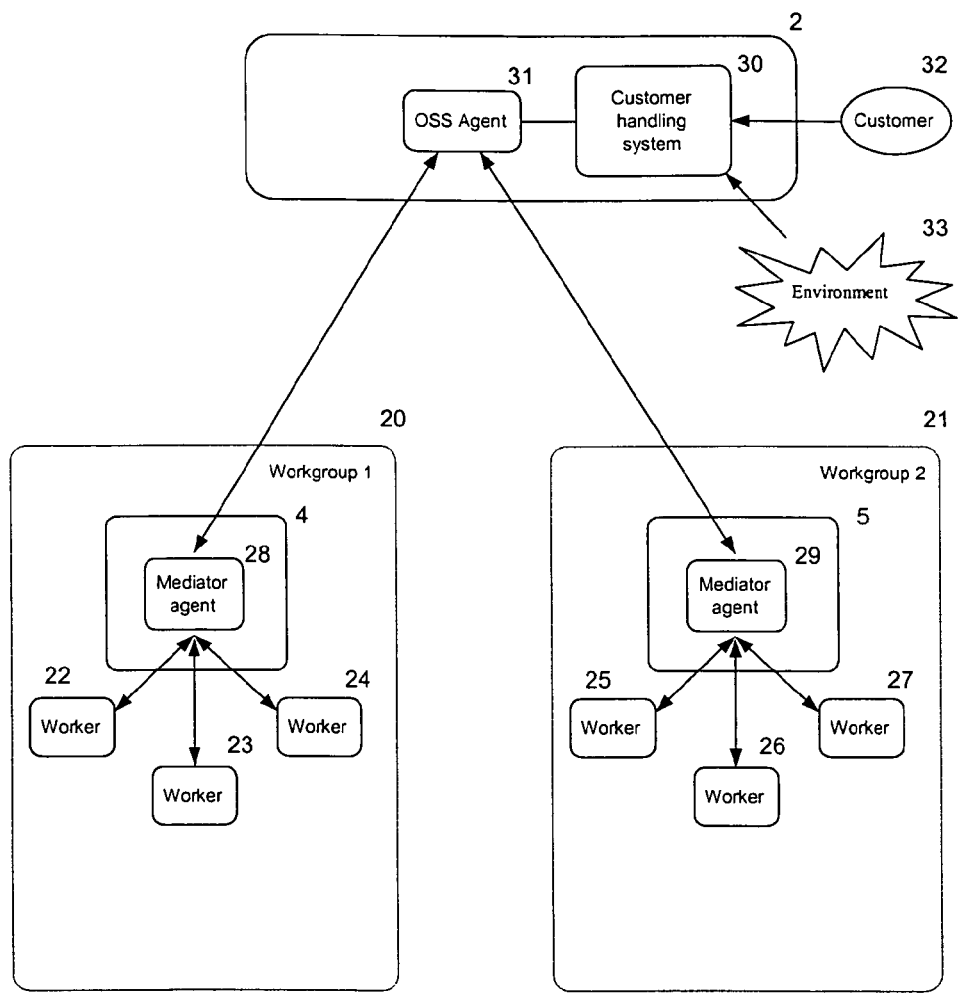
FIG. 2 illustrates the structure of a work allocation system in accordance with the invention.

FIG. 2 is a more detailed layout of the work allocation system 1 described above with reference to FIGS. 1a and 1b. In this embodiment, review of work items for allocation to a resource is exemplified in the context of allocating jobs to workers in a team.

The work allocation server 2 comprises an operational support system (OSS) 2, for example a billing and work scheduling system. The OSS 2 is provided with, or generates, a definition of a work project to be carried out by one or more workgroups 20, 21. Each workgroup 20, 21 includes a plurality of workers 22-24; 25-27, each of whom has access to a workgroup terminal 4, 5. Each of the workgroup terminals 4, 5 runs a software program referred to herein as a mediator agent 28, 29, which is capable of communicating with the OSS 2 and each of a plurality of workers 22-27 in the workgroups 20, 21 via a graphical user interface (GUI).

The operational support system (OSS) 2 includes a work item handler 30 and an OSS agent 31. Customers 32, or the environment 33, generate work items that are acquired by the work item handler 30, for example a customer handling system, maintenance schedule or fault detector. The acquired work items are then passed to the OSS agent 31 which interfaces with the mediator agent 28, 29 in each workgroup 20, 21.

Embodiments arise from a crucial realization that the needs and wishes of workers in the market should be taken into account when evaluating the cost and/or benefit of agreeing to undertake a piece of work. Furthermore, when faced with the problem of allocating work among groups of workers it has been recognized that, in order to allocate work efficiently, a group of workers is most preferably regarded as a single entity. Having recognized the importance of treating groups or workers as single entities, embodiments provide a representation of that entity that is sufficiently flexible and dynamic to enable the composition thereof to change, which is representative of actual changes in composition of a group of workers.

Accordingly the embodiment is concerned with allocation of work from the OSS 31 to the mediator agents 28, 29, each of which represents a group of workers. A mediator agent 28, 29 is arranged to bid for work on behalf of the workers associated therewith, and has responsibility for ensuring that the work that it successfully bids for can be completed by its workers.

In an embodiment of the invention the mediator agents 28, 29 are arranged to use preference information when allocating work and are thus able to bias markets in accordance with the preferences of workers carrying out the work.

An advantage of the invention is that, when work is allocated, there is a good chance that the worker(s) are suitable, permitted, willing & likely to carry out the work. Thus a further advantage is that the workers are likely to receive work allocations that are appropriate to their working preferences, meaning that they are likely to be highly motivated in the longer term.

Figure 4:
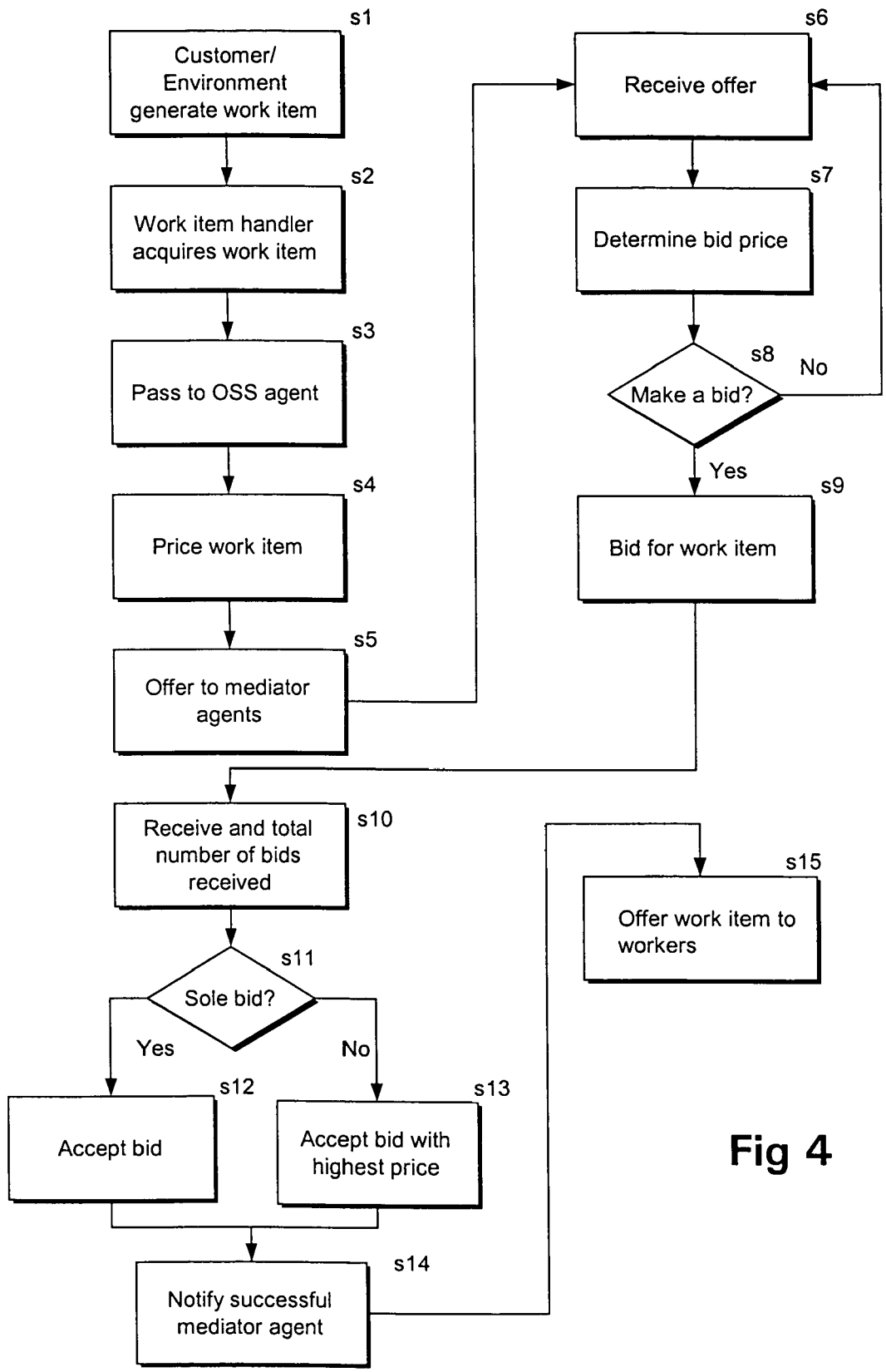
FIG. 4 is a flow chart illustrating the operation of the system of FIG. 2.

FIG. 4 illustrates the allocation of a work item from its generation through to its completion. An embodiment of the invention will be described with reference to FIGS. 5, 6, 7 and 8 in the context of step s7 of the process.

Figure 3:
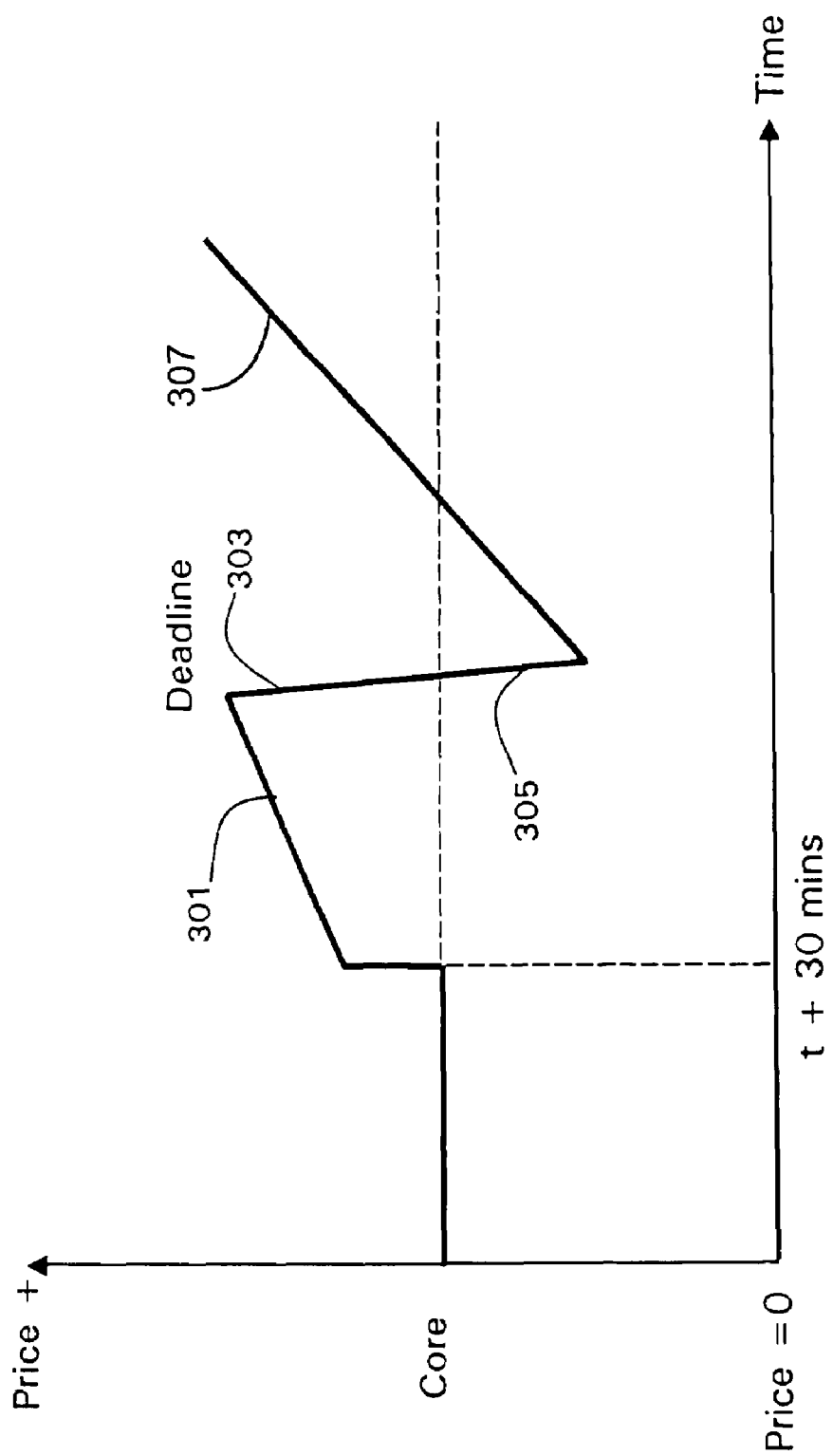
FIG. 3 is a graph illustrating a cost function applied by an operational support system forming part of the work allocation system of FIG. 2.

Initially the work item is generated by a customer 32 or the environment 33 (step s1) and acquired by the work item handler (step s2). The work item handler passes the item to the OSS agent 31 (step s3), which prices the work item using a cost function, such as that shown in FIG. 3. The cost function can reflect business priorities, for example the urgency of the work with respect to penalty clauses, or the value of the customer according to some model (step s4). In general the price of a work item varies with time, increasing 301 as the time approaches a deadline 303 set by the customer 32, decreasing 305 rapidly as the deadline is passed, and then increasing 307 again. Thus the price offered by the OSS agent 31 is dependent both on the time that the work item was received from the work item handler 30 and the deadline for that work item.

For example, when the deadline 303 is passed, the OSS agent 31 will price a work item low, because the priority for the work item is low, meaning that the reward allocated by the business for carrying out the work item at this time is low.

The mediator agent 28, 29 for each workgroup receives the offer (step s6) and uses the preferences of its workgroup to identify whether any of its workers can carry out the work (step s7). In the context of this embodiment, preferences are essentially a summary of observed worker behaviour—that is to say that it is assumed that a worker does what he/she prefers to do, so that, by recording his/her work activities, his/her preferences are implicitly recorded.

In the embodiment, it is assumed that a database DB comprises data sets corresponding to work carried out, or selected, by workers in the workgroup. A data set can be viewed as a fixed-size table with rows and columns, where each row is a record in the data (corresponding to a worker) and each row has many columns, each of which is an attribute in the data. Each attribute can take on a set of values.

In this embodiment, the mediator agent 28 is interested in evaluating a target object, or a class, which is an attribute found in the data set whose values it wants to predict when given the values of the other attributes (e.g. given attributes job type, job location, customer type, customer location etc., are any of the workers likely to perform the work item?).

Figure 5:
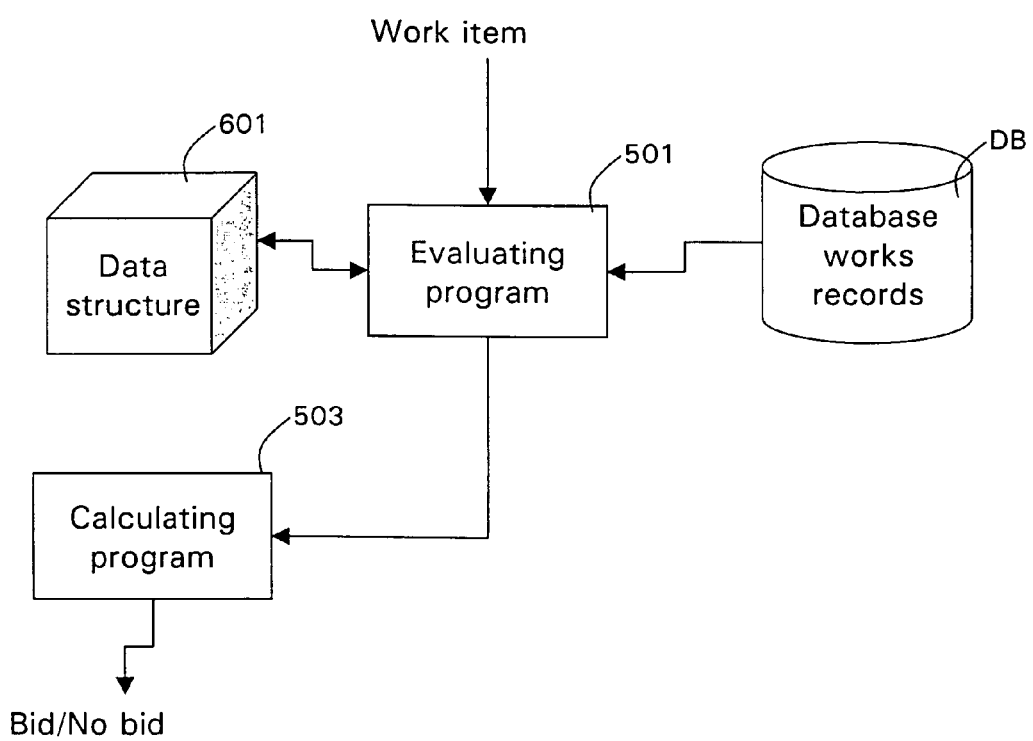
FIG. 5 is a schematic block diagram showing programs accessible to the mediator agent forming part of the work allocation system of FIG. 2.

Accordingly, referring to FIG. 5, the embodiment includes an evaluating program 501 for evaluating whether or not a worker in the workgroup can carry out the work item by predicting a value for class does/does not do work item. The evaluating program 501 is run by the mediator agent 28 during step s7.

In overview, the evaluating program 501 uses the records in the database (or alternative) to create a data structure 601 (FIG. 6), which is a three dimensional matrix comprising class, herein referred to as outcome (I—in work allocation context "do the work/will not do the work); attributes (a—in work allocation context: job type, job location, customer type, customer location etc) and values (v—values that the attributes can take). A particular cell 37 in the structure contains a count of number of times a particular outcome has occurred for a given attribute a and value v. The evaluating program 501 then takes, as input, the work item offered at step s5, (together with the attributes thereof) and evaluates, on the basis of information in the data structure 601, an outcome. This outcome indicates whether or not the workgroup is likely to carry out the work item.

Figure 6:
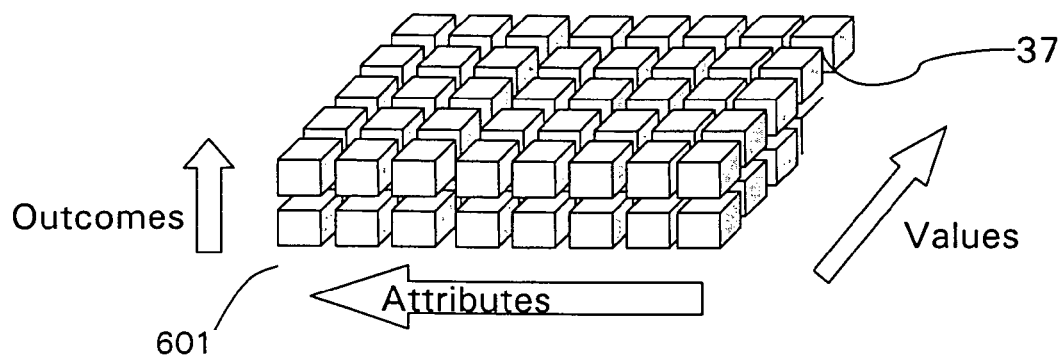
FIG. 6 illustrates a data structure used to generate an outcome, or value for a class.
Figure 8:
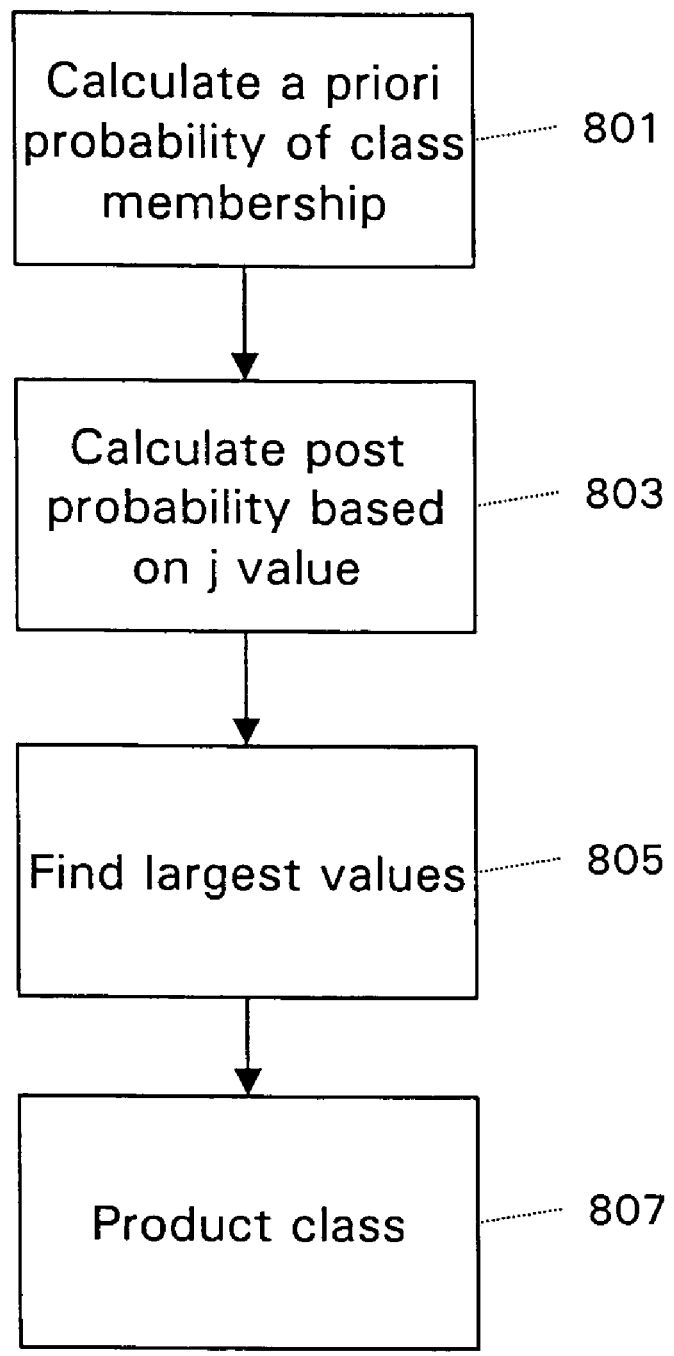
FIG. 8 is a flow-chart illustrating the generation of the classifier from the data shown in FIG. 7.

The evaluation method is now described in more detail, with reference to FIGS. 6, 7 and 8. For the sake of clarity the method is described in the context of a road-crossing scenario rather than allocation of a work item because the number of attributes in a road-crossing scenario is far fewer than those involved in allocation of a work item. In a road-crossing scenario the attributes, outcomes and values comprise:

outcome (I) comprises cross road; do not cross road;
attributes (a) comprise light colour, urgency; and
values comprise red, amber, green, urgent, middle, none.

In this particular example, the evaluating program 501 evaluates the probability of a worker crossing the road given a red light and the fact that he has to cross the road urgently.

Assuming the dataset to comprise twenty road-crossing events for each of three workers (so that the database DB stores 60 records), the evaluating program firstly creates a data structure 601 corresponding thereto. A two-dimensional representation thereof is shown in FIG. 7.

Referring to FIG. 8, the evaluating program 501 then evaluates 801, on the basis of data recorded hitherto, the ratio of both the number of road crossings to number of road crossing events and the ratio of the number of null road crossings to number of road crossing events. This is referred to as evaluating a-priori probability of class membership, as described in Shannon and Weaver, "The mathematical theory of communication", Urbana III, 1949.

Thus referring to FIGS. 7 and 8, the a-priori probabilities for cross/don't cross (p(y)) are calculated 801:

41+6+60+30+60+60+30=287 for cross

19+54+60+30+60+30=253 for don't cross

Total number of road crossing events=540

So p(y) for cross is 287/540=0.53148 & p(y) for don't cross is 0.46851.

The evaluating program then evaluates 803 post priori probabilities of outcomes a) crossing and b) not crossing the road, based on the a priori probabilities calculated at step 801. Specifically, the evaluating program 501 applies the following equation (Equation 1):

$$j(y \mid X = x) = p(y \mid x)\log\left(\frac{p(y \mid x)}{p(y)}\right)$$

where
y is the value of an outcome (cross, don't cross)
x is the value of an attribute (red, urgent etc.)
X is an attribute (colour, urgency)
j value is an indicator identifying the probability of class membership (described in detail in P. Smyth and R. M. Goodman, 'An information theoretic approach to rule induction from databases,' IEEE Transactions on Knowledge and Data Engineering, vol. 4, no. 4, pp. 301-316, August 1992)
$j(y \mid X=x)$ is the value of j for an outcome y when X is x.
$p(y \mid x)$ is the probability of y when X=x, calculated by dividing the number of times an outcome has been y when the attribute value for the work item was x
p(y) is the probability of the outcome ever taking this value (calculated from the a priori probabilities at step 801)

Referring again to FIG. 6, application of this equation yields the following:

Red && Cross
p(y|x)=47/180=0.26111
0.26111/0.53148=0.49128
log (0.49128)=−0.30866
j(red|cross)=−0.080595
Red && Don't cross
p(y|x)=133/180=0.73888
0.73888/0.46851=1.577103
log 1.577103=0.19786
j(red|don't cross)=0.1461965
Urgent && Cross
p(y|x)=161/180=0.89444
0.89444/0.53148=1.68293
log 1.6829=0.226066
j(urgent|cross)=0.2022028
Urgent && Don't cross
p(y|x)=19/180=0.1055
0.1055/0.46851=0.225300
log 0.225300=−0.6472377
j(urgent|don't cross)=−0.068359

Expressed formally, the evaluating program calculates j-values for each y for the value x which is taken by attribute X for all X.

The evaluating program then identifies 805 the largest j-value (in this example urgent && cross), and whichever outcome corresponds to this j-value (here cross) is returned by the evaluating program as the likely outcome (i.e. class value). As an alternative to returning the outcome corresponding to the largest j-value, the evaluating program could evaluate an average of all of the j values for an outcome by summing all the j-values for each outcome (y). In this case whichever outcome corresponds to the average j-value is returned 807 by the evaluating program 501.

Instead of using Equation 1 to identify the most informative attribute, and selecting the action to be taken on the basis thereof, other information measures could be employed. These other methods include the Bayes rule method, or the information gain measure, for which reference is directed to R. Quinlan "Induction of decision trees" Machine Learning, 1; 81-106 (1986). A survey of suitable techniques can be found in I Kononenko "On Biases in Estimating Multi-Valued Attributes" In Mellish, C (ed). Proceedings of the International Joint Conference on Artificial Intelligence, 1995 (IJCAI '95). pp 1034-1040.

The data structure 601 is a particularly convenient way of expressing data records corresponding to work environments, where workers may migrate between teams or leave the organisation at any time: a record corresponding to a new worker can be simply added to the data structure 601, and information relating to a particular worker can be removed by subtracting the record from the data structure 601.

Thus individual worker records can easily be added and removed from the data structure (and thus effectively from team decision making). This additive feature of the data structure 601 can be seen from the example below:

Assume that the database comprises records for workers X and Y. Assume that the records corresponding to worker X show that worker X has approached a road crossing 100 times, on a amber light with urgent need to cross the road. The data shows that, given these conditions, he has crossed 80 times. Given the same conditions, worker Y has crossed the road 100 times. The records for Worker X can be expressed as a matrix having the following elements:

{amber, don't cross}=20,
{amber, cross}=80
{urgent, cross}=80
{urgent, don't cross}=20.

and those for worker Y:
{amber, cross}=100
{urgent, cross}=100.

All other values are 0.

A data structure 601 based on these matrices contains the following four values:
{amber, don't cross}=20
{amber, cross}=180
{urgent, cross}=180
{urgent, don't cross}=20 each of which is simply the sum of elements of the individual matrices.

Figure 9:
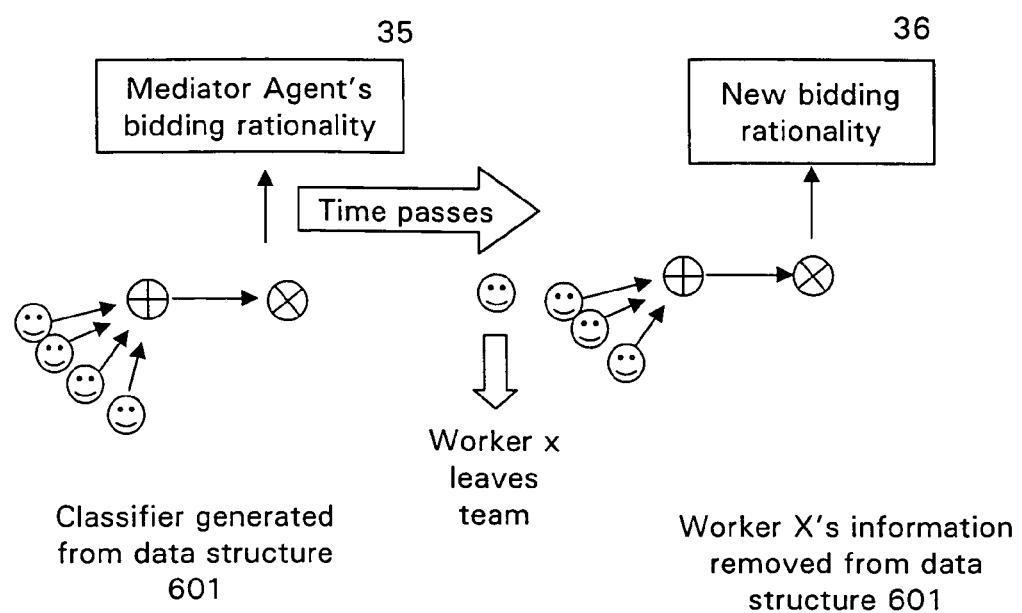
FIGS. 9 and 10 are schematic diagrams illustrating the generation of a bidding strategy from the data structure of FIG. 6.
Figure 10:
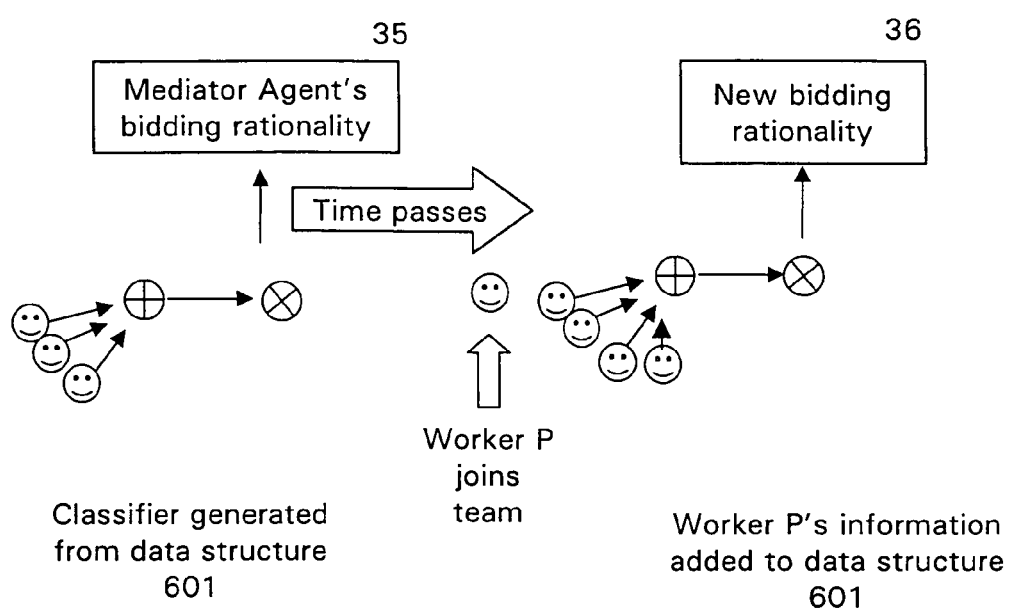

In the context of allocating jobs to particular workgroups, a mediator agent's bidding strategy 35, which is based on the class value returned by the evaluating program and is discussed below, can thus readily be changed to a new bidding rationality 36 when a worker leaves, or joins, a workgroup (shown schematically in FIGS. 9 and 10 respectively). For example, as depicted in FIG. 9, the classifier generated from data structure 601 first represents four workers as factored into the mediator agent's bidding rationality 35. However, as time passes, one worker X leaves the team and that single worker's information can be conveniently removed from data structure 601 to leave three workers factored into the agent's new bidding rationality 36. The reverse situation is depicted at FIG. 10 where a worker P joins three already present team workers which event is accommodated by adding the new worker's information to data structure 601 to leave four workers factored into the agent's new bidding rationality 36.

Use of the outcome, or probability, returned at step 807 is now described. Returning to FIG. 4, having received the class value from the evaluating program (will do work, will not do work), and assuming that the class value indicates that the workgroup can do the work, the mediator agent 28 calculates whether it should make a bid for the work item (step s8). The mediator agent 28 employs a calculating program 503, which calculates whether the allocation of the work will meet the local business priorities of the mediator agent 28. These local business priorities can include constraints imposed by health and safety constraints; targets for total work time for its workgroup; and targets for performing certain volumes of certain types of work. The calculating program 503 can apply a modifying factor to the probability returned at step 807, and compares the modified probability with a condition for bidding for the work.

As a result of the calculation, the mediator agent 28, 29 for the workgroup may decide not to bid for the work (step s8), but instead to wait for the next offer on the next available work item (step s6). If the mediator agent 28, 29 decides that its local business priorities will be met, it makes a bid for the work item (step s9). The OSS agent 31 receives bids from all workgroups and determines how many bids it has received for the work item (step s10). If only one mediator agent makes a bid (step s11), that bid is accepted by the OSS agent 31 (step s12).

If more than one mediator agent makes a bid (step s11), the OSS agent 31 accepts the bid at the highest price (step s13). For example, at step s4 the OSS agent 31 provides a work item with a relatively high price P. The mediator agent 28 for the first workgroup 20 determines that it is likely to be able to allocate the work item to its workers, but its workgroup is relatively busy and cannot do the work urgently. It is therefore prepared to offer P-50 for the work item. The mediator agent 29 for the second workgroup 21 also determines that it can allocate the work item to its workers, but this workgroup is not very busy, so that the work item will assist the workgroup in reaching its targets. The second mediator agent 29 is therefore prepared to offer P-30 for the work item. In this case, the OSS agent 31 accepts the offer of P-30 from the second mediator agent 29 and allocates the work item to it.

The OSS agent 31 informs a selected mediator agent 29 that its bid has been successful (step s14). The mediator agent 29 then allocates/sells the work on to the workers (step s15). In essence, the mediator agent 29 sells the work to the workers at a price that offsets its investment in purchasing the work from the OSS agent 31. The mediator agent 28, 29 prices work based on two factors, the value of the work to the overall business as expressed by the OSS agent 31, namely the cost price to the mediator and the probability value returned at step 807. In addition the mediator agent 28, 29 may model the impact on the team's work schedule of each particular worker doing a piece of work and adjust the price of the work accordingly (e.g. to motivate the team to carry out the work item).

What is claimed is:

1. A method of operating a work allocation system for allocating work items to worker resources including a plurality of groups of worker resources, each group comprising a plurality of individual worker resources, said work allocation system comprising a work allocation server; a group terminal for each group; and a communication link between said work allocation server and each group terminal, said method of operation comprising:

storing in a group store, for each group of worker resources, a data structure identifying attributes of work items previously allocated to at least some of the worker resources in the group;

adding or removing from said data structure contributions from work items previously allocated to an individual worker resource when said individual worker resource respectively joins or leaves a group;

operating said work allocation server to send one or more offers of work items to each said group terminal via said communications link;

operating a group terminal for each group to:
   i) receive an offer of a work item for the group, said offer including attributes of said work item;
   ii) retrieve at least data relevant to said offer from said group store for the group;
   iii) using at least one of said attributes of said work item to compare said work item with the data structure to evaluate the probability that one of the worker resources in the group will carry out the work item;
   iv) compare the evaluated probability with a suitability criterion so as to identify whether one of the worker resources in said workgroup is suitable to carry out the work item;
   v) generate a bid for said work item in response to said offer on finding that at least one of said worker resources is suitable to carry out the work item; and
   vi) send said generated bid to said work allocation server via said communications link.

2. A method according to claim 1 wherein, if one of the worker resources in the group is identified as being suitable to carry out the work item, the method further includes evaluating a price to bid for the work item.

3. A method according to claim 1, in which the evaluating step includes evaluating posterior probabilities of a worker resource being capable of carrying out the work item on the basis of data indicative of previous work items carried out by a worker resource.

4. A method according to claim 1 further comprising generating said work allocation server to:
   offer the work item to a plurality of groups;

receive a plurality of bids from respective group terminals;

select one of the bids in accordance with selection criteria and allocate the work item to the group corresponding to the selected bid.

5. A method according to claim 4, in which the step of offering the work item includes evaluating a price for the work item on the basis of urgency associated therewith.

6. A method according to claim 1 wherein:

said offer includes values of attributes of said work item; and said data structure comprises a summary of previous allocation decisions made on behalf of the group broken down by each attribute of the work items and by the outcome of the decision whether to bid for the work item and worker summaries also broken down by outcome and each attribute.

7. A method according to claim 6, further including operating said group terminal to receive a signal identifying that the bid has been successful;

for at least some of the worker resources, evaluate a similarity between the work items and work items previously allocated thereto;

select at least one worker resource on the basis of the similarity;

for each selected worker resource, apply a price to the work item proportionate to the similarity; and offer the work item to the selected worker resources at the respective applied price.

8. A work allocation system for allocating work items to worker resources including a plurality of groups of worker resources, said allocation system comprising:

a group store for each group of worker resources, each group comprising a plurality of individual worker resources, said store storing a data structure comprising values corresponding both to attributes of the worker resources in the group and attributes of work items previously allocated to at least some of the worker resources in the group;

an interface enabling the addition to or removal from said data structure contributions from work items previously allocated to an individual worker resource when said individual worker resource respectively joins or leaves a group;

a work allocation server;

a group terminal for each group;

a communication link between said work allocation server and said group terminal for each group, each of said group terminals being arranged in operation to:

i) receive an offer of a work item for the group from said work allocation server via said communications link, said offer including attributes of said work item;

ii) retrieve at least data relevant to said offer from said group store for the group;

iii) using at least one of said attributes of said work item to compare said work item with the data structure to evaluate the probability that one of the worker resources in the group will carry out the work item based on said offer and said relevant data;

iv) compare the evaluated probability with a suitability criterion so as to identify whether one of the worker resources in said workgroup is suitable to carry out the work item;

v) generate a bid for said work item in response to said offer on finding that at least one of said worker resources is suitable to carry out the work item; and vi) send said generated bid to said work allocation server via said communications link.

9. Apparatus according to claim 8, wherein said group terminal is further arranged in operation to evaluate a price to bid for the work item and to signal the priced bid to the work allocation server.

10. Apparatus according to claim 9, wherein, on receipt of a signal identifying that the bid has been successful, is each group terminal is further arranged in operation to:

evaluate for at least some of the worker resources the similarity between the work item and work items previously allocated to the worker resource;

select at least one worker resource on the basis of the similarity;

apply a price to the work item proportionate to the similarity; and offer the work item to the selected worker resources at the respective applied price.

11. A system according to claim 8 wherein:

said offer includes values of attributes of said work item; and said data structure comprises a summary of previous allocation decisions made on behalf of the group broken down by each attribute of the work items and by the outcome of the decision whether to bid for the work item and worker summaries also broken down by outcome and each attribute.

* * * * *